United States Patent [19]

Ito et al.

[11] Patent Number: 5,055,187
[45] Date of Patent: Oct. 8, 1991

[54] FUEL FILTER INCORPORATED IN A FUEL TANK

[75] Inventors: Koichi Ito; Kitio Ogaki, both of Ibaraki, Japan

[73] Assignee: Kyosan Denki Kabushiki Kaisha, Tokyo, Japan

[21] Appl. No.: 416,367

[22] Filed: Oct. 3, 1989

[51] Int. Cl.⁵ .............................................. B01D 35/02
[52] U.S. Cl. ..................................... 210/172; 210/232; 210/349; 210/455; 210/457; 210/461; 210/499
[58] Field of Search ........ 210/172, 232, 445, 459–463, 210/486, 416.4, 452, 455, 457, 499, 349

[56] References Cited

U.S. PATENT DOCUMENTS

| | | | |
|---|---|---|---|
| 3,875,059 | 4/1975 | Maschino | 210/172 |
| 3,932,153 | 1/1976 | Byrns | 210/445 |
| 4,312,753 | 1/1982 | Bell | 210/461 |
| 4,617,121 | 10/1986 | Yokoyama | 210/460 |
| 4,783,260 | 11/1988 | Kurihara | 210/232 |
| 4,874,510 | 10/1989 | Akira et al. | 210/172 |

*Primary Examiner*—Robert A. Dawson
*Assistant Examiner*—Matthew O. Savage
*Attorney, Agent, or Firm*—Flynn, Thiel, Boutell & Tanis

[57] ABSTRACT

A known fuel filter is formed by a meshed body in a bag shape made of a synthetic resin while the meshed body is penetrated to form a fuel passage which is open toward the inside of the meshed body. The known fuel filter is attached to a portion adjacent to a bottom of the fuel tank for preventing water and a dust accumulated inside the fuel tank from being drawn inside the fuel filter. However, the known fuel filter has the fuel passage penetrating the central portion of the meshed body so that the degree of freedom of attachment is reduced. On the other hand, a fuel filter according to the present invention comprises a piece of meshed body being folded double, an outer flange and an inner flange respectively having a fuel passage and being connected to each other from the inside and the outside of the doubled folded portion, a swollen supporter provided integrally with or separately from the inner flange. The peripheries of three sides of the meshed body are welded and the fuel pipe is connected to the outer flange. With such an arrangement, the fuel pipe can be installed along the side wall of the fuel tank. The swollen supporter may comprise a flat plate and a projecting wall projecting from the flat plate which crosses a longitudinal direction of the flat plate while a trimming hole is provided at a central portion of the flat plate and the swollen supporter is cantilevered so that the swollen supporter can be swung vertically.

11 Claims, 9 Drawing Sheets

FUEL FILTER INCORPORATED IN A FUEL TANK

BACKGROUND OF THE INVENTION

The present invention relates to an improvement of a fuel filter incorporated in a fuel tank, the fuel filter having a suction passage penetrating an end of a meshed body of a bag shape and open to the inside of the meshed body and a swollen supporter at the inside thereof.

A gravity of a fuel such as gasoline, etc. used in automobiles is lighter than that of water. Hence, if water once enters into the fuel tank, the water is accumulated at the bottom of the fuel tank separated from the fuel. Once the water is accumulated in the fuel tank, it is not discharged outside for thereby increasing the amount of accumulated water.

Meanwhile, inasmuch as a suction pipe for drawing the fuel from the fuel tank is required to draw as much fuel as possible and to reduce the fuel level in the fuel tank as low as possible, it is advisable to position an opening of the suction pipe near the bottom of the fuel tank as close as possible. If the opening of the suction pipe is very close to the bottom of the fuel tank, the water accumulated in the bottom of the fuel tank is liable to be drawn from the opening of the suction pipe. Hence, there is provided a fuel filter formed in a meshed body and attached to a tip end of the suction pipe for preventing the water from being drawn from the fuel tank but allowing only the fuel to be drawn from the fuel tank and allowing impurities in the fuel tank to be filtered.

A liquid has a surface tension peculiar thereto. Since the meshed body has a plurality of perforations, a resistance generated when the liquid passes the perforations is varied depending on the surface tension peculiar to the liquid. For example, as far as the resistance of the liquid is concerned when the water and the fuel pass the perforations, the resistance of water is greater than that of the fuel. Hence, at the time when the meshed body is soaked both in the water and the fuel, the suction pipe draws the fuel only. The present fuel filter incorporated in the fuel tank has been made to utilize this phenomenon.

A prior art fuel filter incorporated in a fuel tank of automobiles will be described with reference to FIG. 19.

A fuel filter unit U comprises a suction member 1, a meshed baggy body 2 and a swollen supporter 3 for keeping a swollen state of the meshed baggy body 2. The suction member 1 comprises an end member 1A to be pressed and fitted in the end portion of a suction pipe P and a fastening member 1B for clamping and fastening a meshed body described later. The meshed baggy body 2 is composed of one meshed body 2A and another meshed body 2B, and the end member 1A penetrates the portion adjacent to the center of the one meshed body 2A. The meshed bodies 2A and 2B are respectively circular or tetragon according to the present invention and the circumferences or four sides thereof are welded (M). The swollen supporter 3 is housed inside the meshed baggy body 2 for keeping the swollen state of the meshed baggy body 2.

However there are the following drawbacks in the prior art fuel filter. Firstly, inasmuch as the suction member 1 penetrates the central portion of the tetragon or circular meshed baggy body 2, an interval H is spaced between the suction pipe P and the periphery of the fuel filter unit U. Even if the suction pipe P is preferably positioned adjacent to a wall of the fuel tank T as close as possible, the suction pipe P must nevertheless be spaced apart from the fuel tank T by the interval H. Accordingly, with the arrangement of the prior art filter, the suction pipe P has to be installed in the fuel tank T with a restricted degree of freedom of installation. When the meshed baggy body 2 is formed, the one meshed body 2A is laid over the other meshed body 2B, and the circumferences thereof 2A, 2B are welded. It took time and labor for welding the circumferences of both meshed bodies 2A, 2B.

Secondly, inasmuch as the fuel filter unit U incorporated in the fuel tank is installed adjacent to the bottom wall of the fuel tank T, there is a likelihood of breakage due to rubbing and abrasion between the bottom wall of the fuel tank and the meshed body 2B upon the occurrence of vibration.

Thirdly, when the fuel is drawn, a pulsation motion is generated in the drawn fuel which affects unfavorably the supply of fuel.

SUMMARY OF THE INVENTION

In view of the drawbacks of the prior art fuel filter incorporated in the fuel tank, the present invention has been made.

It is therefore a first object of the invention to provide a fuel filter incorporated in a fuel tank capable of providing a fuel pipe along a wall of the fuel tank.

It is a second object of the present invention to provide a fuel filter incorporated in a fuel tank having a swollen supporter for keeping a swollen state of a meshed body of the fuel filter and capable of reducing contact pressure generated between the swollen supporter and the fuel tank and preventing breakage of the meshed body due to wear thereof and preventing vibration from transmitting to generate a noise.

To achieve the above object, the fuel filter incorporated in the fuel tank according to the present invention is characterized in comprising a suction member having a fluid passage provided by penetrating a meshed body of a bag shape, and a swollen supporter for supporting a swollen state of the meshed body, in which the suction member is composed of an outer flange and an inner flange.

A fuel filter incorporated in a fuel tank comprising a suction path having a fluid passage formed by penetrating a meshed body of a bag shape, and a swollen supporter provided inside the meshed body for keeping a swollen state of the meshed body, the suction path being composed of an outer flange and an inner flange, openings being provided at a bent portion which is formed by folding the meshed body in double, and the folded portion of the meshed body being clamped by the outer flange and the inner flange from outer and inner sides thereof, the swollen supporter being provided at the inner flange, and the meshed body being welded at three peripheries thereof.

The above and other objects, features and advantages of the present invention will become more apparent from the following description taken in conjunction with the accompanying drawings.

DESCRIPTION OF THE PREFERRED EMBODIMENT

Figure 1:
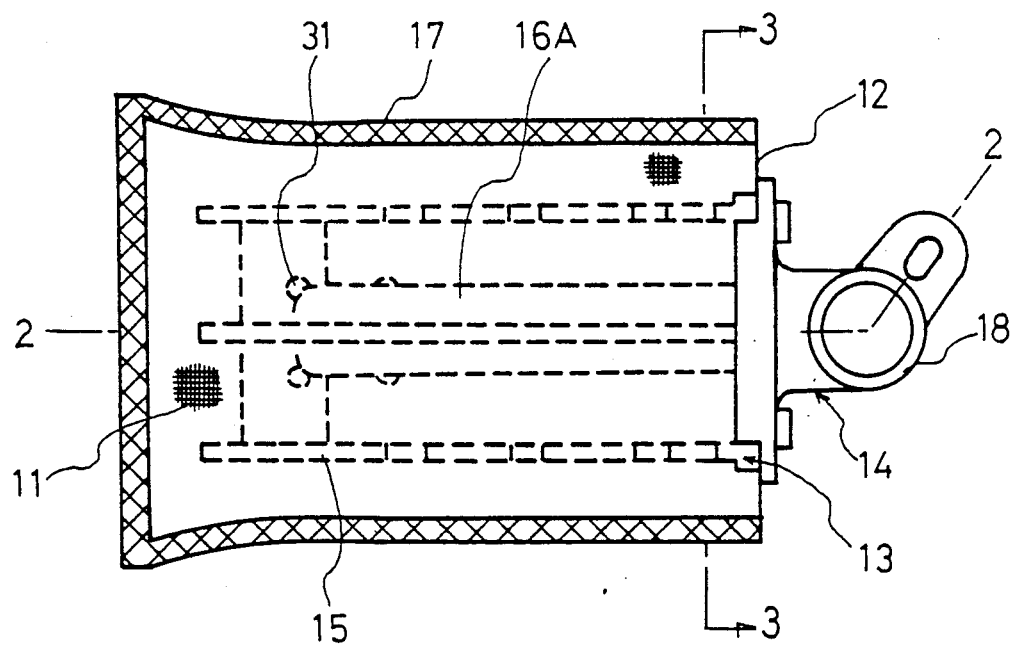
FIG. 1 is a plan view of a fuel filter incorporated in a fuel tank according to an embodiment of the present invention.

First Embodiment (FIGS. 1 to 10):

A fuel filter incorporated in a fuel tank according to a preferred embodiment of the present invention will be described with reference to FIGS. 1 to 10.

A fuel filter incorporated in a fuel tank comprises a suction path 16 having a fluid passage formed by penetrating a meshed body 11 of a bag shape and a swollen supporter 15 provided inside the meshed body 11 for keeping a swollen state of the meshed body, the suction path 16 being composed of an outer flange 14 and an inner flange 13, openings 20, 23, 24 being provided at a folded portion 12 which is formed by folding the meshed body 11 in double, and the bent portion of the meshed body 11 being clamped by the outer flange 14 and the inner flange 13 from outer and inner sides thereof, the swollen supporter 15 being provided at the inner flange 13, and the meshed body 11 being welded at three peripheries thereof.

The fuel filter incorporated in the fuel tank according to the first embodiment will be described more in detail with reference to FIGS. 1 to 3.

A piece of the meshed body 11 is folded. The inner flange 13 and the outer flange 14 clamp the folded portion 12 from an inner side and an outer side of the folded portion 12 of the meshed body 11 and are engaged with and connected to each other. The swollen supporter 15 for keeping a swollen state of the meshed body 11 in the flange 13 and an inlet portion 16A in a piped shape of the suction path 16 for drawing the fuel are integrally formed by a resin. The inner flange 13 and the swollen supporter 15 are covered from the upper portion and the lower portion thereof by the meshed body 11 while three peripheral sides of the meshed body 11 are welded or sealed along a seal line 17 to form the bag shape. The inlet portion 16A of the suction path 16 is connected to an outlet portion 18 of the suction path 16 integrally formed with the outer flange 14 at the folded portion 12 of the meshed body 11 so that the outlet portion 18 is projected laterally from the outer flange 14 and extended upward to be connected to a fuel pump (not shown).

Figure 4:
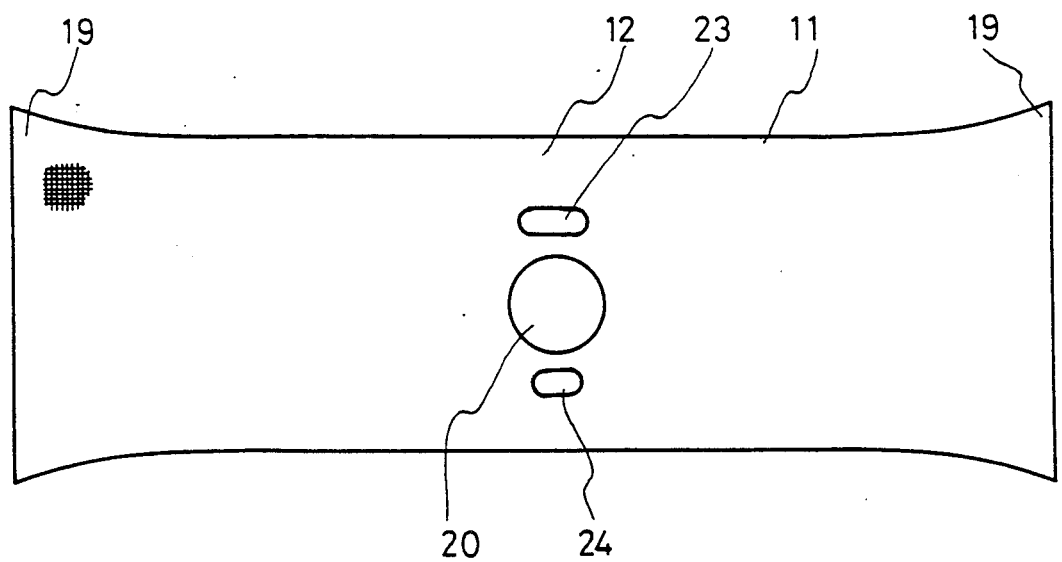
FIG. 4 is a plan view of assistance in explaining a meshed body expanded and employed in the present invention.

The meshed body 11 has both end portions 19 which are increasingly tapered as shown in FIG. 4 and wider than the width of center portion of the folded portion 12. The folded portion 12 has an opening 20 through which the inlet portion 16A of the suction path 16 projected from an end surface of the inner flange 13 (illustrated in detail in FIG. 5) penetrates and openings 23, 24 through which engaging projections 21, 22 formed at both sides of the inlet portion 16A (refer to FIG. 5) penetrate. The meshed body 11 is made of resin, etc. and has a meshed structure having a plurality of perforations penetrating inside and outside thereof. The meshed body 11 is not limited to have the shape set forth above.

Figure 5:
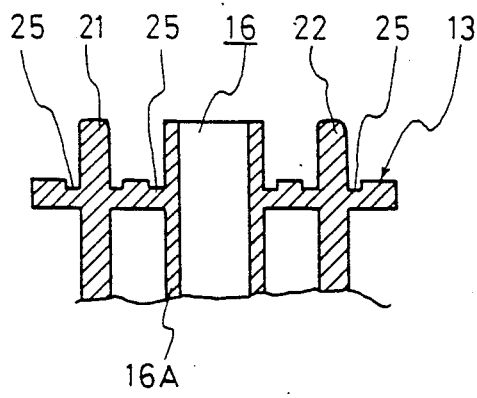
FIG. 5 is a fragmentary cross sectional view of an inner flange employed in the present invention.
Figure 6:
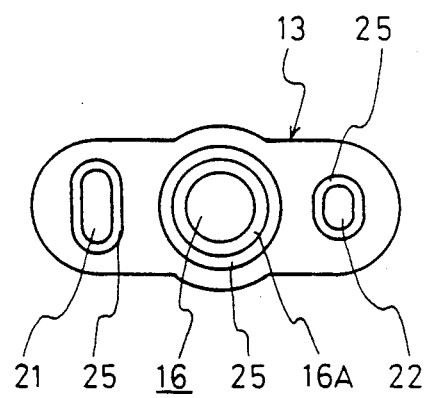
FIG. 6 is a front elevational view of the inner flange for explaining a slip prevention groove employed in the present invention.

As shown in FIGS. 5 and 6, the inlet portion 16A of the suction path 16 formed in the inner flange 13 has a cylindrical (tubular) projection directed toward the outer flange 14 at the connection thereof and the engaging projections 21, 22 formed at the both sides thereof. The cylindrical projection of the inlet portion 16A has a root periphery defining a slip prevention groove 25 for caulking, the inlet portion 16A and preventing the inlet portion 16A from slipping out while the engaging projections 21, 22 have root peripheries defining slip prevention grooves 25, 25 for caulking the engaging projections 21, 22 and preventing the engaging projections 21, 22 from slipping out. The engaging projection 21 has a size and shape different from that of the engaging projection 22 for thereby facilitating the engaging operation.

Figure 7:
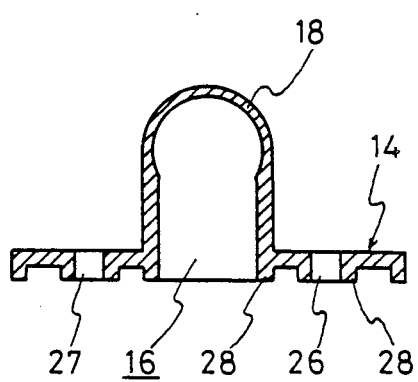
FIG. 7 is a fragmentary cross sectional view of an outer flange employed in the present invention.
Figure 8:
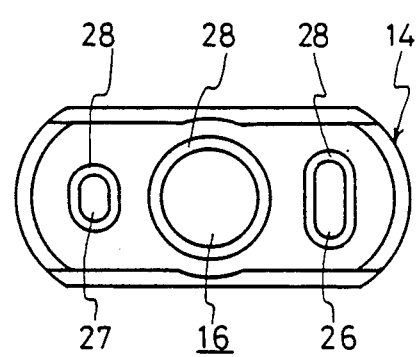
FIG. 8 is a front elevational view of the outer flange for explaining a slip prevention groove employed in the present invention.

Whereupon, the outer flange 14 has the outlet portion 18 for engaging with and connecting to the inlet portion 16A of the suction path 16 at the central portion thereof as shown in FIGS. 7 and 8. The outlet portion 18 is to engage with the cylindrical projection of the inlet portion 16A of the suction path 16 formed in the inner flange 13. Engaging holes 26, 27 with which the engaging projections 21, 22 formed in the inner flange 13 are engaged are formed at both sides of the outlet portion 18. Upon insertion of the engaging projections 21, 22 into the engaging holes 26, 27, head portions of the engaging projections 21, 22 are crushed for preventing the engaging projections 21, 22 from slipping out as shown in FIG. 1. Formed at the periphery of the outlet portion 18 of the suction path 16 is a slip prevention projection 28 projecting cylindrically and directed toward the inner flange 13 while formed at outer peripheries of the engaging holes 26, 27 is a slip prevention projection 28 projecting cylindrically and directed toward the inner flange 13.

Figure 9:
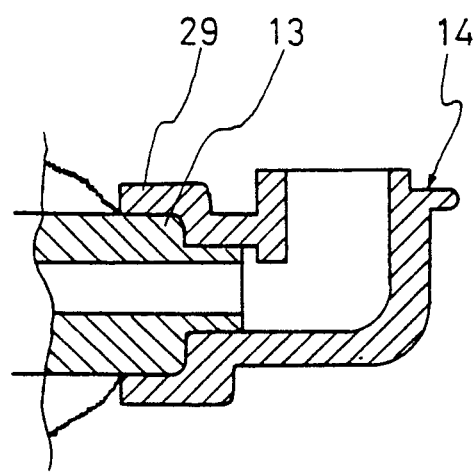
FIG. 9 is a cross sectional view for assistance in explaining an engaging portion between the inner flange and the outer flange.
Figure 10:
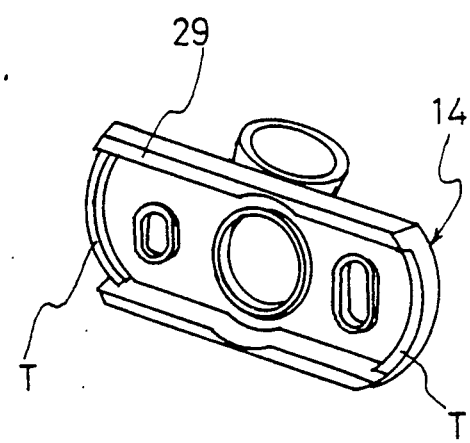
FIG. 10 is a fragmentary perspective view of the outer flange.
Figure 11:
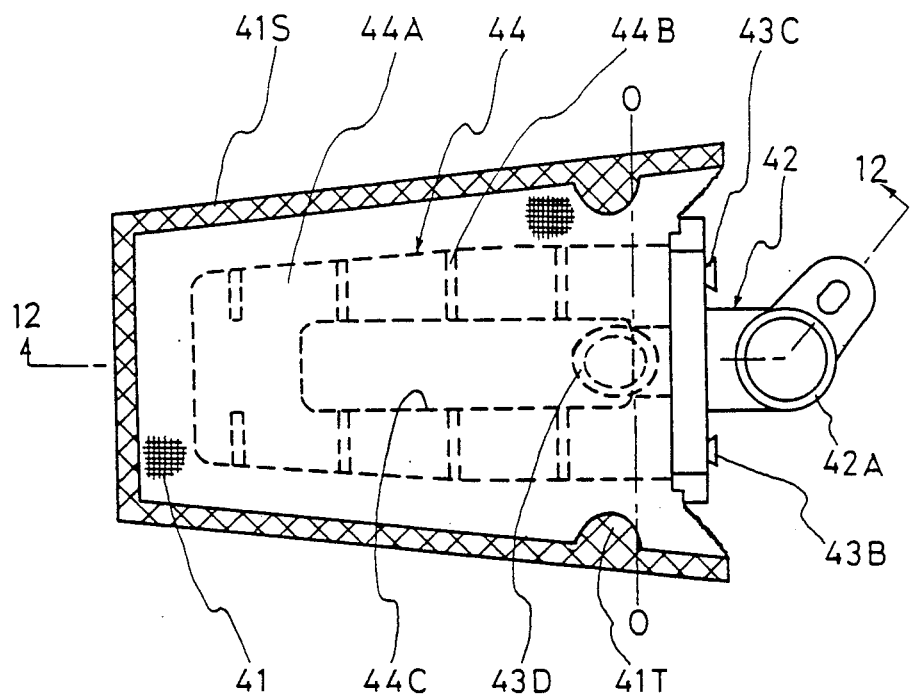
FIG. 11 is a plan view of a fuel filter incorporated in a fuel filter according to another embodiment of the present invention.

Formed at the periphery of the outer flange 14 is a cover 29 extending in the direction of the inner flange 13 as shown in FIGS. 9 and 10 and the cover 29 has a partially notched portion as denoted at T in FIG. 10. The cover 29 is provided for preventing the engaging state from being jolted as well as for clamping the meshed body 11 while the notched portion T is provided for preventing the meshed body 11 from generating a wrinkle.

Figure 2:
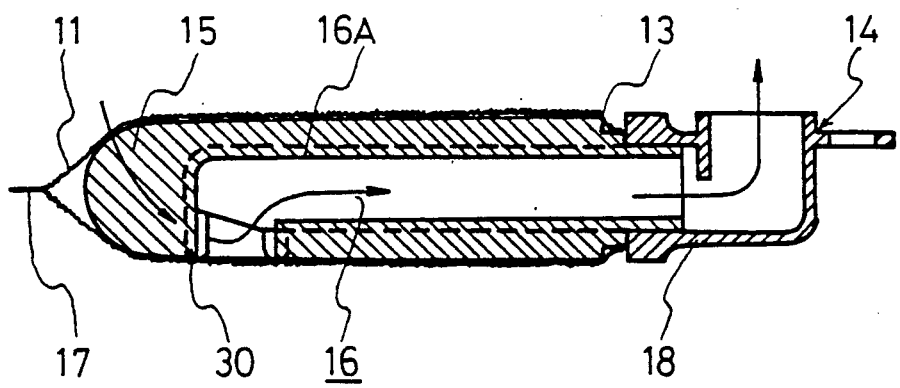
FIG. 2 is a cross sectional view taken along 2—2 of FIG. 1.
Figure 3:
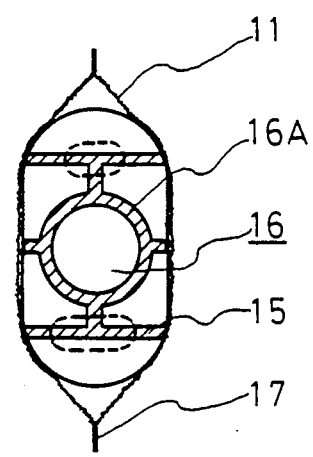
FIG. 3 is a cross sectional view taken along 3—3 of FIG. 1.

Now back to FIGS. 1 and 2, provided at the periphery of a fuel inlet end 30 of the suction path 16 are a plurality of projections 31 for preventing the fuel inlet end 30 from being brought closely into contact with the meshed body 11 or for moving the meshed body 11 away from the fuel inlet end 30.

Inasmuch as the outer flange 14 is provided at the folded portion 12 of the meshed body 11, it is possible to position the outer flange 14 adjacent to the side wall of the fuel tank whereby the degree of freedom of installation can be increased and the layout of the installation can be simplifed.

Second Embodiment (FIGS. 11 through 14):

A fuel filter incorporated in a fuel tank according to a second embodiment of the present invention will be described with reference to FIGS. 11 through 14.

A piece of meshed body 41 is folded double and has openings 41A, 41B, 41C through which projections of an inner flange described later are inserted. The meshed body 41 is folded double at the portion where the openings 41A, 41B, 41C are provided. An outer flange 42 and an inner flange 43 clamp the meshed body 41 adjacent the openings 41A, 41B, 41C and are engaged with and connected to each other from both sides thereof. Defined at the outer flange 42 is an outlet portion of a suction path while defined at the inner flange 43 is an inlet portion of the suction path. Provided at the outlet portion of the outer flange 42 are two connection openings 42A, 42B. The connection opening 42A is connected to a suction pipe (not shown) and the connection opening 42B is engaged with the cylindrical inlet portion defined in the inner flange 43. Provided at the outer flange 42 are engaging holes 42C, 42D through which engaging projections 43B, 43C defined in the inner flange 43 are inserted. A cross sectional shape of the engaging projections 43B is different from that of the engaging projections 43C whereby the outer flange 42 and the inner flange 43 are prevented from turning upside down and pressed to and fitted in each other. The inlet portion 43A of the inner flange 43 has a suction port 43D provided at the end thereof which forms an inclined cut opening for thereby increasing the surface area of the suction port and at the same time for preventing the suction port 43D from being blocked by the meshed body 41. In the case the meshed body 41 is clamped by and fixed to the outer flange 42 and the inner flange 43, the inlet portion 43A of the suction path defined in the inner flange 43 penetrates the opening 41A provided at the meshed body 41 while the engaging projections 43B, 43C penetrate the openings 41B, 41C. A cylindrical projection of the inlet portion 43A is inserted into the connection opening 42B and the engaging projection 43B is inserted into the engaging hole 42C and the engaging projection 43C is inserted into the engaging hole 42D. At this time provided at the outer periphery of the cylindrical projection of the inlet portion 43A is an annular projecting stepped portion 43E while defined at an inner periphery of the connection opening 42B is an annular groove 42E whereby the projecting stepped portion 43E is engaged with the annular groove 42E for preventing slip.

There is provided in the inner flange 43 a swollen supporter 44 for keeping a swollen state of the meshed body 41. The swollen supporter 44 is integrally formed with the inner flange 43 according to the present invention and is composed of a flat body 44A and a plurality of projecting wall bodies 44B projecting upward from the flat body 44A. The flat body 44A is made of a substantially rectangular plate and has a central portion forming a trimming hole 44C in the longitudinal direction thereof. The projecting wall bodies 44B cross the longitudinal direction of the flat plate 44A and each has a height which is set arbritrarily. Each height of the projecting wall bodies 44B according to the second embodiment is set to be gradually lower at the portion closer to the tip end thereof to thereby facilitate the welding at the end portion of the meshed body 41.

The meshed body 41 has three sides having a predetermined width welded by ultrasonic wave welding, etc. and is formed in bag shape by the welding portion 41S and a double-folded portion. Provided at the meshed body 41 is a bending welding portion 41T extending along the inner side of the meshed body 41 in order that the swollen supporter 44 can be elastically deformed with ease (deformation by bending or returning to its original state) at the root thereof. A thickness of the meshed body 41 is reduced by the bending welding portion 41T which does not obstruct the elastic deformation of the swollen supporter 44 so that the swollen supporter 44 can be elastically deformed with ease.

When the fuel filter is installed in the fuel tank, the meshed body 41 is provided to be in contact with a bottom wall (not shown) of the fuel tank. Inasmuch as the meshed body 41 is provided to contact the bottom wall of the fuel, there is a likelihood to generate an abrasion due to rubbing of the meshed body 41 against the bottom wall of the fuel tank caused by vibration. However, the meshed body 41 and the swollen supporter 44 are cantilevered and the bending welding portion 41T is provided so that the filter swings vertically as illustrated by arrow V FIG. 12 about line O—O (line including the bending welding portion 41T) in FIG. 11. As a result, contact pressure generated by the contact between the meshed body 41 and the bottom wall is reduced to decrease the abrasion.

Figure 12:
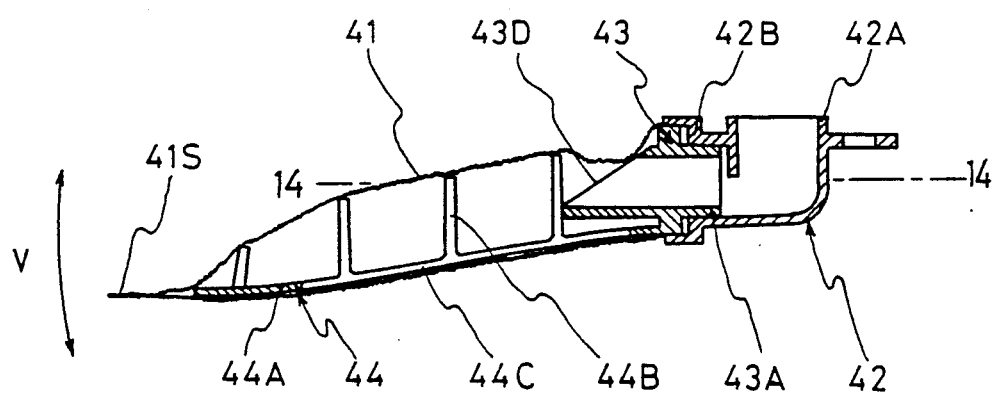
FIG. 12 is cross sectional view taken along 12—12 of FIG. 11.
Figure 13:
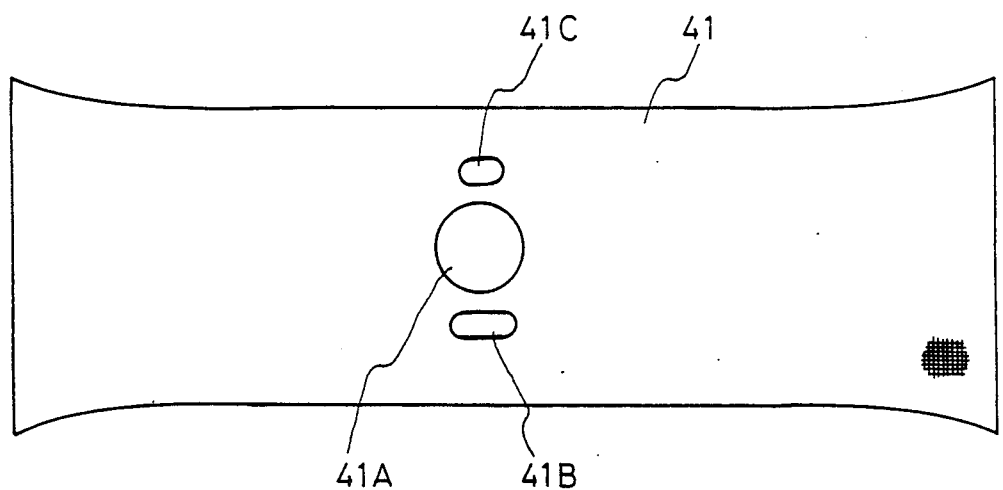
FIG. 13 is a plan view of a meshed body expanded and employed in the present invention.
Figure 14:
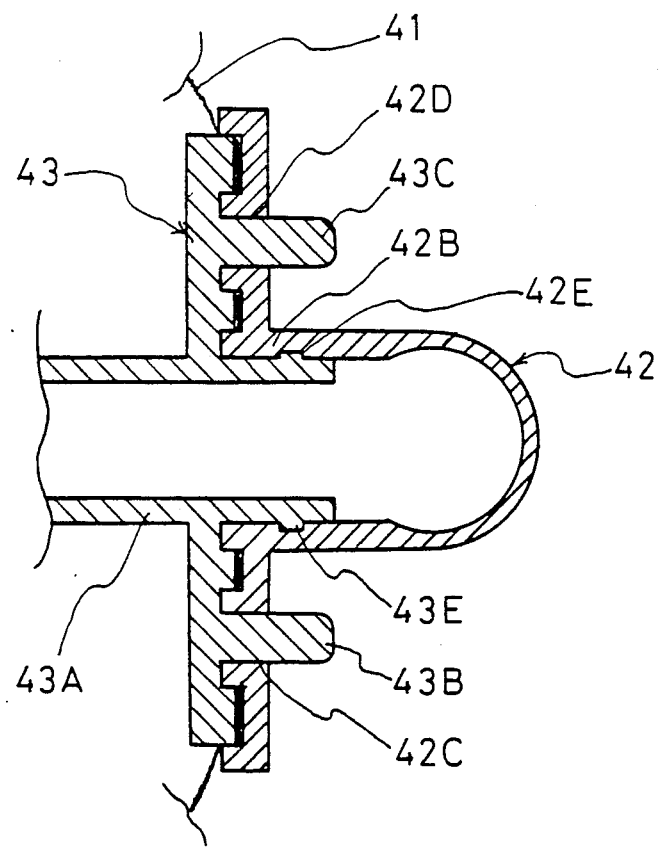
FIG. 14 is a cross sectional view taken along 14—14 of FIG. 12.

Inasmuch as the swing motion as illustrated at V in FIG. 12 becomes the movement to fold the bag body composed of the meshed body 41 up and down, the bag body becomes a folding and bending resistance. Hence, the bag body is hardly folded and bent with ease. However, provision of the bending welding portion 41T facilitates folding and bending the bag body so that the folding and bending resistance by the bag body per se is reduced.

Figure 15:
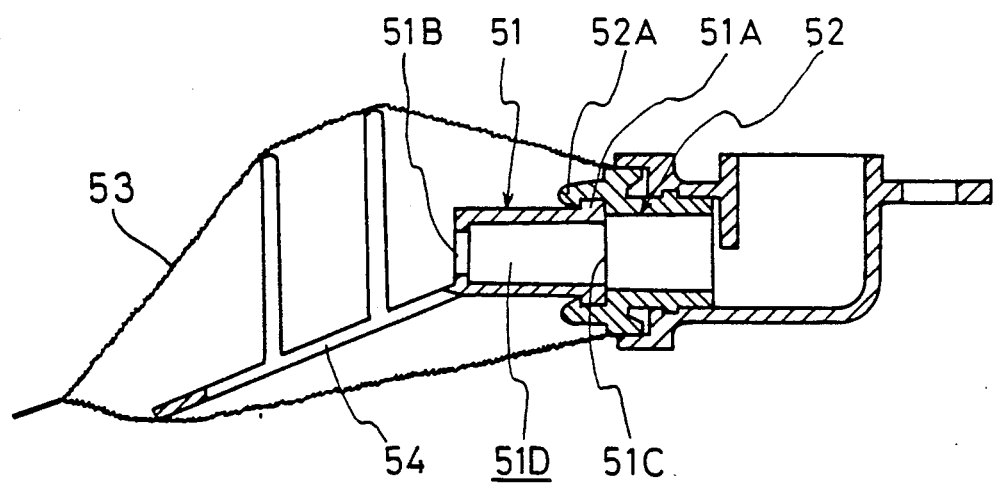
FIG. 15 is a cross sectional view of a fuel filter incorporated in a fuel tank according to a further embodiment of the present invention.

Third Embodiment (FIG. 15):

A fuel filter incorporated in a fuel tank according to another embodiment of the present invention will be described with reference to FIG. 15.

There is provided a damper chamber 51 having a predetermined volume and an engaging step 51A to which a nail portion 52A defined in an inner flange 52 is snap-on fitted. The damper chamber body 51 has one end provided with a fuel inlet opening 51B and the other end provided with a fuel outlet opening 51C while the engaging step 51A is formed at the edge of the fuel outlet opening 51C of the damper chamber body 51.

The nail portion 52A is provided at a peripheral edge of a suction opening 52B of the inner flange 52. There is provided a swollen supporter 54 at one end of the damper chamber body 51 for keeping the swollen state of a meshed body 53. Formed inside the damper chamber body 51 is a damper chamber 51D having a predetermined volume. Other structural arrangements of the fuel filter incorporated in the fuel tank according to the third embodiment are the same as that of the second embodiment.

According to the fuel filter incorporated in the fuel tank of the third embodiment, fuel drawn into the damper chamber 51D through the fuel inlet opening 51B of the damper chamber body 51 remains first in the damper chamber 51D to prevent the pulsation of the fuel fluid. If the damper chamber 51D is not provided, a high frequency vibration generated in the fuel pump is delivered to the fuel to thereby generate a noise or a different sound in the fuel liquid. However, if the damper chamber 51D is provided, the high frequency noise or the high frequency different sound generated in the fuel pump is attenuated in the damper chamber 51D whereby the noise and the diffent sound generated in the fuel liquid can be prevented.

Figure 16:
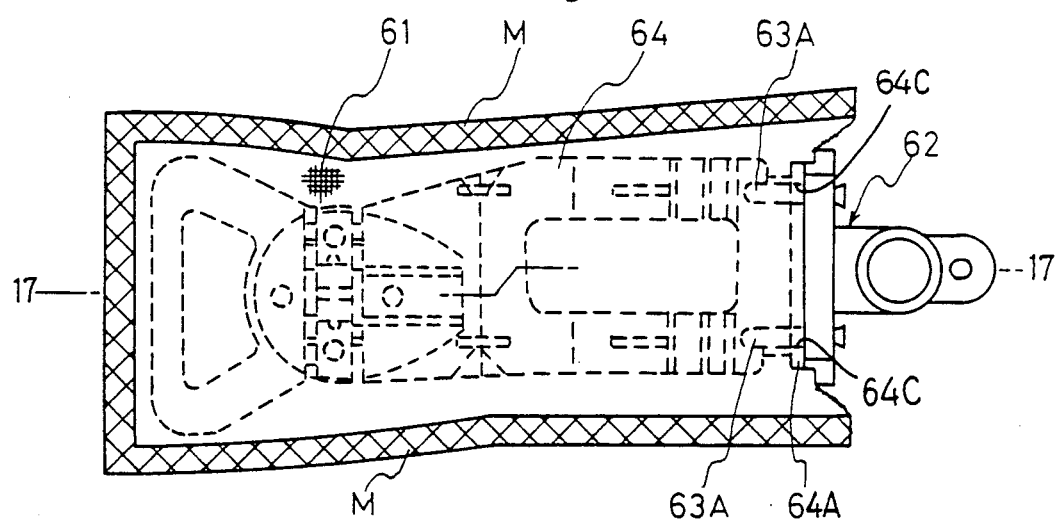
FIG. 16 is a plan view of a fuel filter incorporated in a fuel tank according to a still further embodiment of the present invention.
Figure 17:
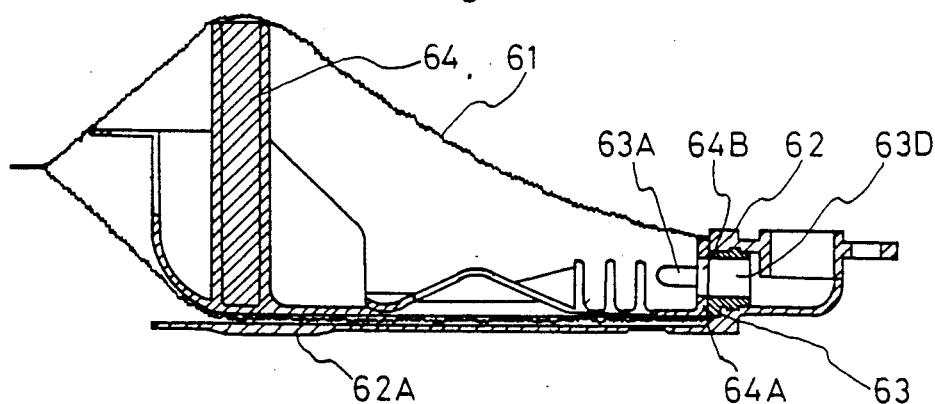
FIG. 17 is a cross sectional view taken along 17-17 of FIG. 16.
Figure 18:
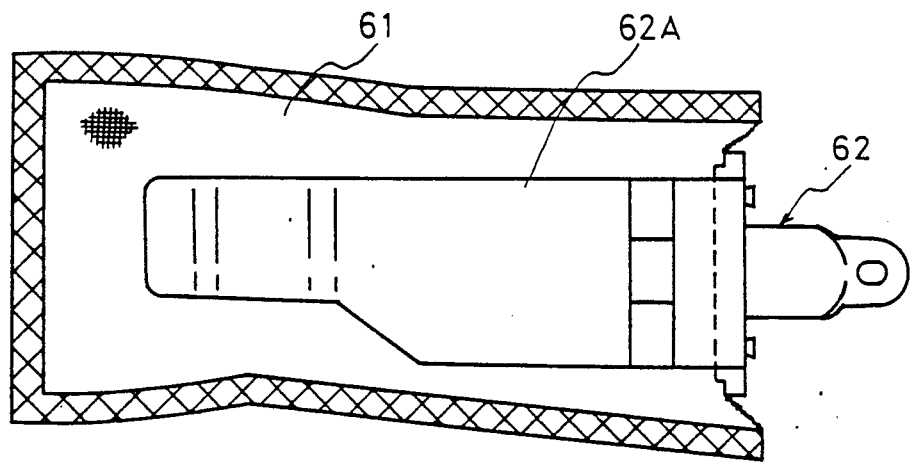
FIG. 18 is a bottom view of FIG. 16.
Figure 19:
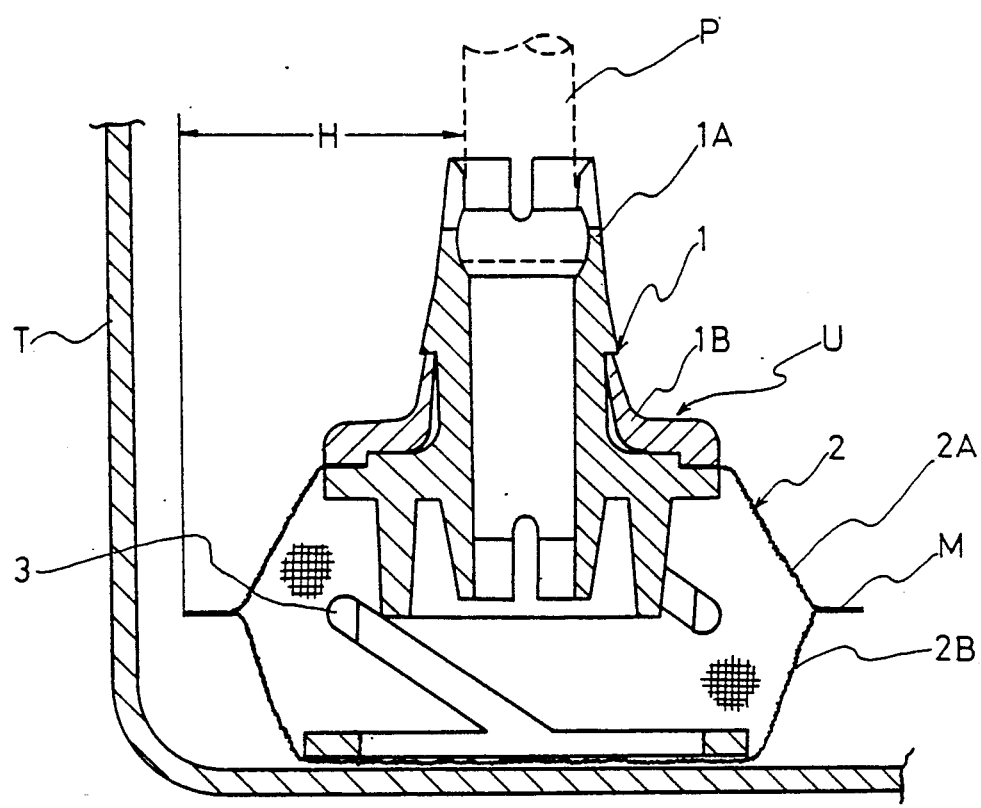
FIG. 19 is a cross sectional view of a prior art fuel filter incorporated in a fuel tank.

Fourth Embodiment (FIG. 16 through 18):

A fuel filter incorporated in a fuel tank according to a fourth embodiment will be described in FIGS. 16 through 18.

According to the fourth embodiment, a meshed body 61 is clamped by an outer flange 62 and an inner flange 63 from inner and outer sides thereof for thereby welding (M) the both sides thereof. Thereafter, a swollen supporter 64 is inserted into a bag body of the meshed body 61 and is pressed and fixed to the inner flange 63. Therefore, provided at the inner flange 63 is a projection member 63A and provided at the swollen supporter 64 is a hole 64C into which the projection member 63A is inserted. There is provided an opening 64B at a connection portion 64A of the swollen supporter 64 so that a suction opening 63D of the inner flange 63 is not blocked. There is provided a strap plate 62A at the outer flange 62 to eliminate the abrasion caused by rubbing between the meshed body 61 and the bottom wall of the fuel tank (not shown) while the meshed body 61 is clamped between the strap plate 62A and the swollen supporter 64. The strap plate 62A is integrally mounted with the outer flange 62 but is mounted separately from the inner flange 63 and thereafter can be mounted on the inner flange 63. The meshed body 61 has an insertion end to be welded after the insertion of the swollen supporter 64.

Inasmuch as the both sides of the meshed body 61 can be welded before the insertion of the swollen supporter 64, the welding operation can be carried out with ease. Furthermore, the strap plate 62A prevents the meshed body 61 from being damaged by abrasion thereof.

An operation of the fuel filter incorporated in the fuel tank according to the present invention having the arrangement set forth above will be described hereinafter.

The fuel passes, as shown in the arrow F in FIG. 2, the meshed body 11, enters inside the bag body surrounded by the meshed body 11, passes the suction path 16 and is delivered to a fuel system apparatus via a pipe (not shown). At this time, even if the water is accumulated in the bottom of the tank, the water is not drawn but only the fuel is drawn since the resistance of the water passing through the meshed body is greater than that of the fuel.

Although the invention has been described in its preferred form with a certain degree of particularity, it is to be understood that many variations and changes are possible in the invention without departing from the scope thereof.

What is claimed is:

1. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange and the inner flange from outer and inner sides thereof, said central portion having an opening therein through which said fluid passage means passes; the supporter being provided at the inner flange; the supporter having a flat plate body extending from the inner flange and a projecting wall body projecting from the flat plate body, the flat plate body having a trimming hole at a central portion thereof; and three peripheries of the mesh body being welded.

2. A fuel filter arrangement according to claim 1, wherein the fluid passage means includes an inlet portion which is projected cylindrically from the inner flange toward the outer flange and which is peripherally surrounded by a groove in said inner flange; the inner flange having engaging projections which have further grooves at root peripheries thereof; said fluid passage means including a connection opening in said outer flange; said outer flange having a slip prevention projection which is defined peripherally of said connection opening and which is projected toward the inner flange, and said outer flange having further slip prevention projections which are defined peripherally of engaging holes provided at the outer flange and which are projected toward the inner flange; and said inlet portion and said engaging projections being respectively received in said connection opening and said engaging holes with the slip prevention projections being engaged in the corresponding grooves.

3. A fuel filter arrangement according to claim 1, wherein the fluid passage means has an inlet portion provided on said inner flange and cylindrically projected from the inner flange to the outer flange and having an annular projecting stepped portion at the outer periphery thereof; said fluid passage means including a connection opening provided at the outer flange, the connection opening having an annular groove at the inner periphery thereof; and the projecting step portion of the inlet portion being engaged with the groove of the connection opening.

4. A fuel filter arrangement according to claim 1, including means for attaching the supporter to the inner flange wherein the supporter is attachable to but provided separately from the inner flange for permitting insertion of the supporter into the mesh body and attachment of the supporter to the inner flange after both sides of the mesh body have been welded but before an insertion end of the mesh body is welded.

5. A fuel filter arrangement according to claim 1, wherein a periphery of an inlet portion at one end of the fluid passage means has an engaging nail which is snap-on fitted with an engaging stepped portion formed at a damper body having a volume inside thereof.

6. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange and the inner flange from outer and inner sides thereof, said central portion having an opening therein through which said fluid passage means passes; the supporter being provided at the inner flange; the mesh body being welded at three peripheries thereof; and the mesh body having a bending welding portion projecting inward therefrom adjacent said inner flange.

7. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange and the inner flange from outer and inner sides thereof, said central portion having an opening therein through which said fluid passage means passes; the supporter being provided at the inner flange; the mesh body being welded at three peripheries thereof; the fluid passage means including an inlet portion which is projected cylindrically from the inner flange toward the outer flange and which is peripherally surrounded by a groove in said inner flange; the inner flange having engaging projections which have further grooves at root peripheries thereof; said fluid passage means including a connection opening in said outer flange; said outer flange having a slip prevention projection which is defined peripherally of said connection opening and which is projected toward the inner flange, and said outer flange having further slip prevention projections which are defined peripherally of engaging holes provided at the outer flange and which are projected toward the inner flange; and said inlet portion and said engaging projections being respectively received in said connection opening and said engaging holes with the slip prevention projections being engaged in the corresponding grooves.

8. A fuel filter arrangement according to claim 7, wherein said inlet portion projects in a tubular path from the inner flange, the inlet portion having an inlet end which is directed downward and a plurality of projections provided at the inlet end for preventing the inlet end from being brought closely into contact with the mesh body.

9. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange and the inner flange from outer and inner sides thereof, said central portion having an opening therein through which said fluid passage means passes; the supporter being provided at the inner flange; the mesh body being welded at three peripheries thereof; the fluid passage means having an inlet portion provided on said inner flange and cylindrically projected from the inner flange to the outer flange and having an annular projecting stepped portion at the outer periphery thereof; said fluid passage means including a connection opening provided at the outer flange, the connection opening having an annular groove at the inner periphery thereof; and the projecting step portion of the inlet portion being engaged with the groove of the connection opening.

10. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange and the inner flange from outer and inner sides thereof, said central portion having an opening therein through which said fluid passage means passes; the supporter being provided at the inner flange; the mesh body being welded at three peripheries thereof; and means for attaching the supporter to said inner flange, the supporter being attachable to but provided separately from the inner flange for permitting insertion of the supporter into the mesh body and attachment of the supporter to the inner flange after both sides of the mesh body have been welded but before an insertion end of the mesh body is welded.

11. In a fuel filter arrangement adapted to be incorporated in a fuel tank and having a fluid passage means which penetrates a bag-shaped mesh body, and a supporter provided inside the mesh body for maintaining a swollen state of the mesh body, the improvement wherein: the fluid passage means includes an outer flange and an inner flange; the mesh body being formed by folding a mesh sheet over onto itself, a central portion of the mesh sheet being clamped by the outer flange the inner flange from outer and inner sides thereof, said central portion having an opening therein through which said fluid passage means passes; the supporter being provided at the inner flange; the mesh body being welded at three peripheries thereof; and a periphery of an inlet portion at one end of the fluid passage means having an engaging nail which is snap-on fitted with an engaging stepped portion formed at a damper body having a volume inside thereof.

* * * * *

UNITED STATES PATENT AND TRADEMARK OFFICE
CERTIFICATE OF CORRECTION

PATENT NO. : 5 055 187

DATED : October 8, 1991

INVENTOR(S) : Koichi Ito et al

It is certified that error appears in the above-identified patent and that said Letters Patent is hereby corrected as shown below:

On the title page; please insert

---[30]    Foreign Application Priority Data

Oct.  7, 1988 [JP]  Japan. . . . . . .63-131033

Aug. 23, 1989 [JP]  Japan. . . . . . . 1-098130---.

Signed and Sealed this

Fourteenth Day of September, 1993

Attest:

BRUCE LEHMAN

*Attesting Officer*     Commissioner of Patents and Trademarks